United States Patent [19]

Okada

[11] Patent Number: 5,499,130
[45] Date of Patent: Mar. 12, 1996

[54] METHOD OF MAKING LIQUID CRYSTAL DEVICE HAVING PLURAL STRIPE-SHAPED RIBS ON ONE SUBSTRATE

[75] Inventor: Shinjiro Okada, Isehara, Japan

[73] Assignee: Canon Kabushiki Kaisha, Tokyo, Japan

[21] Appl. No.: 465,567

[22] Filed: Jun. 5, 1995

Related U.S. Application Data

[60] Continuation of Ser. No. 113,821, Aug. 31, 1993, abandoned, which is a division of Ser. No. 836,914, Feb. 19, 1992, Pat. No. 5,264,954.

[30] Foreign Application Priority Data

Feb. 20, 1991 [JP] Japan .................... 3-045626

[51] Int. Cl.⁶ .................... G02F 1/1343; G02F 1/13
[52] U.S. Cl. .................... 359/87; 359/100
[58] Field of Search .................... 359/54, 76, 87, 359/99, 100

[56] References Cited

U.S. PATENT DOCUMENTS

| | | | |
|---|---|---|---|
| 4,639,089 | 1/1987 | Okada et al. | 359/77 |
| 4,639,722 | 1/1987 | Urabe et al. | 359/100 |
| 4,655,561 | 4/1987 | Kanbe et al. | 359/100 |
| 4,681,404 | 7/1987 | Okada et al. | 359/100 |
| 4,682,858 | 7/1987 | Kanbe et al. | 359/99 |
| 4,709,995 | 12/1987 | Kuribayashi et al. | 359/100 |
| 4,712,873 | 12/1987 | Kanbe et al. | 359/63 |
| 4,712,874 | 12/1987 | Sekimura et al. | 359/68 |
| 4,712,875 | 12/1987 | Tsuboyama et al. | 359/81 |
| 4,712,877 | 12/1987 | Okada et al. | 359/100 |
| 4,714,323 | 12/1987 | Katagiri et al. | 359/100 |
| 4,728,176 | 3/1988 | Tsuboyama et al. | 359/100 |
| 4,738,515 | 4/1988 | Okada et al. | 359/100 |
| 4,740,060 | 4/1988 | Komura et al. | 359/81 |
| 4,744,639 | 5/1988 | Tsuboyama | 359/100 |
| 4,747,671 | 5/1988 | Takahashi et al. | 359/87 |
| 4,763,994 | 8/1988 | Kaneko et al. | 359/87 |
| 4,765,720 | 8/1988 | Toyono et al. | 359/100 |
| 4,776,676 | 10/1988 | Inoue et al. | 359/100 |
| 4,778,259 | 10/1988 | Kitayama et al. | 359/100 |
| 4,796,979 | 1/1989 | Tsuboyama | 359/100 |
| 4,796,980 | 1/1989 | Kaneko et al. | 359/100 |
| 4,802,744 | 2/1989 | Shindo et al. | 359/66 |
| 4,818,078 | 4/1989 | Mouri et al. | 359/100 |
| 4,824,218 | 4/1989 | Kuno et al. | 359/100 |
| 4,834,506 | 5/1989 | Demke et al. | 359/100 |
| 4,838,663 | 6/1989 | Lagerwall et al. | 359/100 |
| 4,859,036 | 8/1989 | Yamanaka et al. | 359/87 |
| 4,861,143 | 8/1989 | Yamazaki et al. | 359/100 |
| 4,902,106 | 2/1990 | Dijon et al. | 359/100 |
| 4,932,757 | 6/1990 | Hanyu et al. | 359/79 |
| 4,932,758 | 6/1990 | Hanyu et al. | 359/100 |
| 4,938,574 | 7/1990 | Kaneko et al. | 359/100 |
| 5,000,545 | 3/1991 | Yoshioka et al. | 359/87 |
| 5,007,716 | 4/1991 | Hanyu et al. | 359/87 |
| 5,124,827 | 6/1992 | Davey | 359/100 |
| 5,264,954 | 11/1993 | Okada | 359/100 |
| 5,316,805 | 5/1994 | Hanyu et al. | 359/76 |

FOREIGN PATENT DOCUMENTS 2166562  5/1986  United Kingdom .

*Primary Examiner*—William L. Sikes
*Assistant Examiner*—Huy Mai
*Attorney, Agent, or Firm*—Fitzpatrick, Cella, Harper & Scinto

[57] ABSTRACT

There is disclosed a ferroelectric liquid crystal device such as a chiral smectic liquid crystal device which is suitable for a gradation display. A chiral smectic liquid crystal is sandwiched between electrode substrates and is driven by an electric field which is applied through electrodes formed on the electrode substrates. At least one of the opposite electrode substrate surfaces periodically has a shape like a stripe-shaped rib. Liquid crystal molecules are oriented so that the normal lines of a plurality of layers which are constructed by a plurality of molecules and are arranged in a uniform direction when they are projected onto the electrode substrate surfaces perpendicularly cross the longitudinal direction of the stripe-shaped rib.

3 Claims, 5 Drawing Sheets

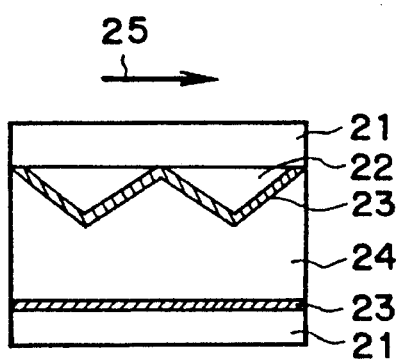
FIG. 2A
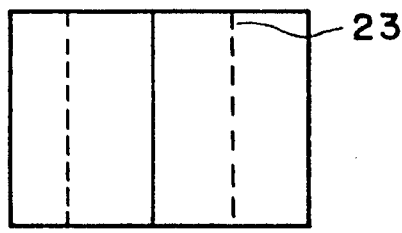
FIG. 2B
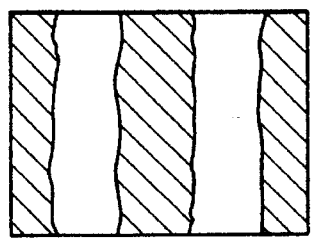
FIG. 2C          T = 50%
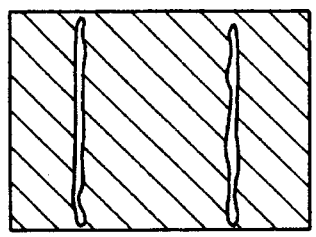
FIG. 2D          T = 5%
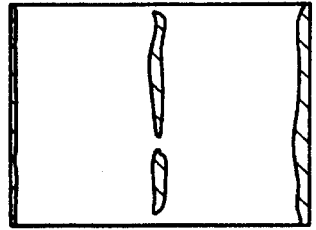
FIG. 2E          T = 95%

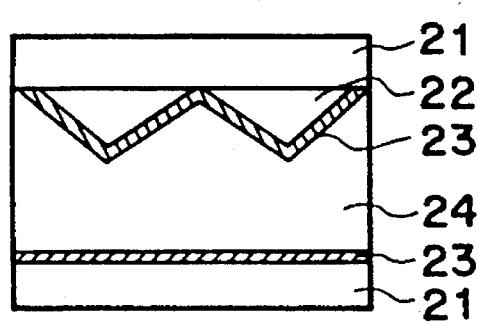
FIG. 3A
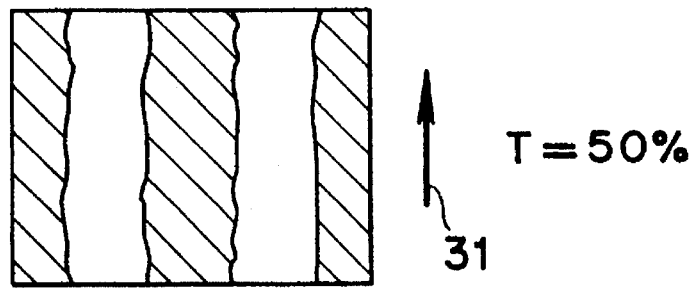
FIG. 3B   T=50%
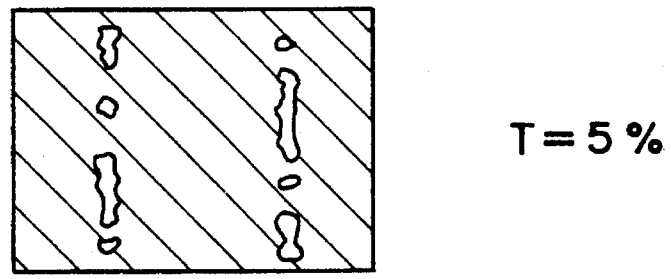
FIG. 3C   T=5%
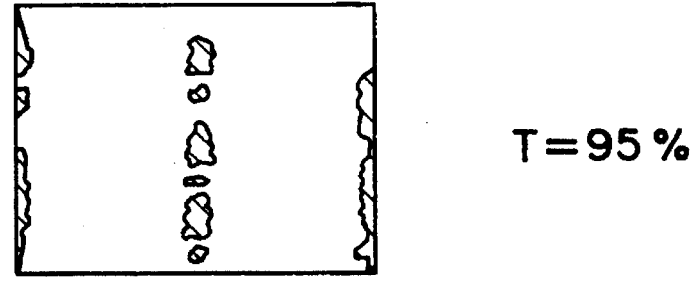
FIG. 3D   T=95%

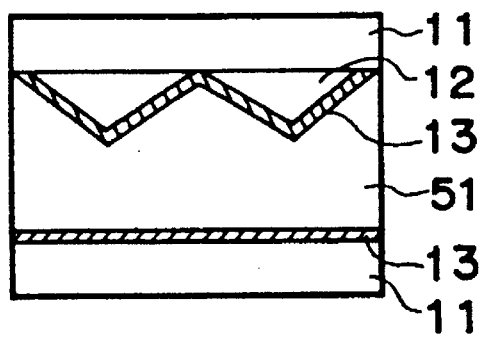
FIG. 5A
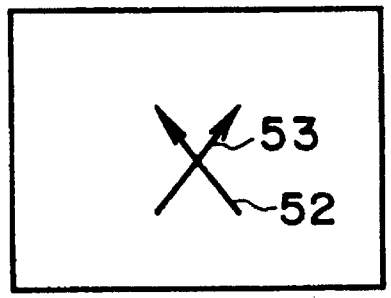
FIG. 5B
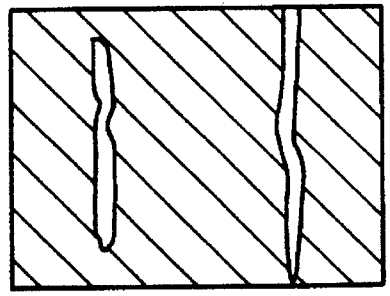
FIG. 5C    T=5%
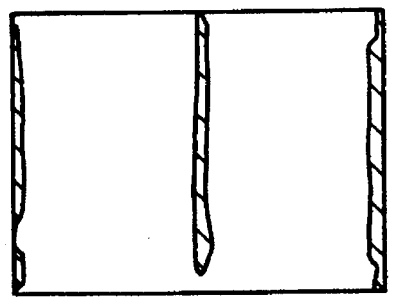
FIG. 5D    T=95%

METHOD OF MAKING LIQUID CRYSTAL DEVICE HAVING PLURAL STRIPE-SHAPED RIBS ON ONE SUBSTRATE

The application is a continuation of application Ser. No. 08/113,821, filed Aug. 31, 1993, now abandoned, which is a division of application Ser. No. 07/836,914, filed Feb. 19, 1992, now U.S. Pat. No. 5,264,954.

BACKGROUND OF THE INVENTION

1. Field of the Invention

The invention relates to a chiral smectic liquid crystal device which is suitable for gradation display.

2. Related Background Art

With respect to a display apparatus using a ferroelectric chiral smectic liquid crystal, there is known a display apparatus in which a ferroelectric chiral smectic liquid crystal (hereinafter, referred to as an FLC) is injected into a liquid crystal cell which is constructed in a manner such that transparent electrodes are formed on two inner surfaces of glass substrates so as to keep a cell gap of about 1 to 3 μm and are subjected to an orienting process and the resultant two glass substrates are arranged so as to face each other. Such display apparatuses have been disclosed in, for instance, U.S. Pat. Nos. 4639089, 4681404, 4682858, 4712873, 4712874, 4712875, 4712,877, 4714323, 4728176, 4738513, 4740060, 4765720, 4778259, 4796979, 4796980, 4859036, 4932757, 4932758, 5000545, and 5007716, and the like.

Among the above conventional techniques, particularly, in the case of a device in which a chevron structure shown in FIG. 1 is formed in the FLC and the FLC is oriented, a bright state under a cross nicols is excellent, so that an enough contrast is obtained. FIG. 1 shows a cross sectional view of the orientation state of an FLC arranged between substrates 11 and 12. An FLC 13 has a structure such that a layer 15 which is constructed by a plurality of liquid crystal molecules 14 is formed and a plurality of such layers 15 are arranged in the same direction and the layers 15 are bent. In the above case, it is preferable that the major axis of each of the liquid crystal molecules 14 is inclined from the substrates 11 and 12 at a pretilt angle $\theta_a$ of, preferably, 5° or more. It is desirable that the above orientation state is obtained by performing the orienting process to the substrates 11 and 12 by rubbing processes 16 and 17 in the same direction.

As a gradation display method using the FLC, there are known methods disclosed in U.S. Pat. Nos. 4,655,561, 4,709,995, 4,712,877, 4,747,671, 4,763,994, 4,765,720, 4,776,676, 4,796,980, 4,802,744, 4,818,078, 4,824,218, and 4,938,574, and the like.

SUMMARY OF THE INVENTION

It is an object of the invention to provide a novel chiral smectic liquid crystal device suitable for gradation display.

According to the invention, there is provided a ferroelectric liquid crystal device in which a chiral smectic liquid crystal is sandwiched between electrode substrates and the chiral smectic liquid crystal is driven by an electric field which is applied through electrodes formed on the electrode substrates, wherein at least one of the opposite electrode substrate surfaces periodically has a shape like a stripe-shaped rib, and the liquid crystal 10 molecules are oriented in a manner such that normal lines of a plurality of layers which are constructed by a plurality of molecules and are arranged in a uniform direction in the case where the normal lines are projected onto the electrode substrate surfaces perpendicularly cross the longitudinal direction of the stripe-shaped rib.

BRIEF DESCRIPTION OF THE DRAWINGS

FIGS. 2A to 2E are a cross sectional view of a ferroelectric liquid crystal device according to an embodiment of the invention and plan views showing display states of such a device;

FIGS. 3A to 3D are a cross sectional view of a ferroelectric liquid crystal device according to a conventional example and plan views showing display states of such a device;

FIGS. 5A to 5D are a cross sectional view of a ferroelectric liquid crystal device according to another embodiment of the invention and plan views showing display states of such a device.

DESCRIPTION OF THE PREFERRED EMBODIMENTS

Figure 1:
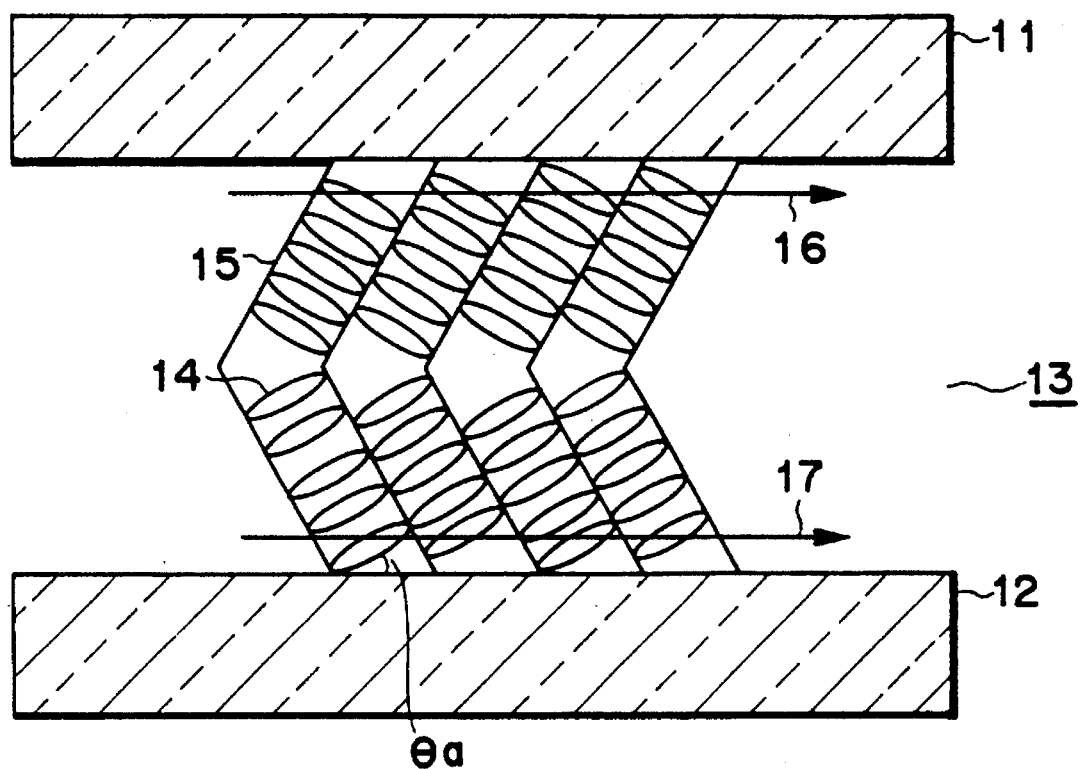
FIG. 1 is a cross sectional view of a liquid crystal which is used in the invention.

The invention will be described with reference to the drawings.

FIG. 2A is a cross sectional view of an FLC according to an embodiment of the invention. FIG. 2B is a plan view of the FLC of FIG. 2A. In the drawings, reference numeral 21 denotes a glass substrate; 22 a rib formed on the glass substrate 21 by using a UV hardening resin of the acrylic system; and 23 an ITO film having a thickness of 1000 Å and 400 Ω☐ which is formed by an ion plating method and a polyimide orientation film containing fluorine atoms formed on the ITO film. The rubbing direction is parallel with the upper and lower glass substrates 21 and perpendicularly crosses the rib 22 as shown by an arrow 25. Reference numeral 24 denotes an FLC arranged between the upper and lower layers 23 and the FLC 24 has characteristics shown in the column A in Table 1 and in a chemical formula 1 shown below. It is suitable to set a width of rib 22 to a value within a range from 10 to 500 μm.

TABLE 1

|  | Column A | | Column B | |
|---|---|---|---|---|
| Temperature (°C.) | 10 | 28 | 40 | 30 |
| $P_s$ (nc/cm$^2$) | 8.4 | 6.6 | 5.1 | 5.8 |
| θ(°) (Max. tilt angle) | — | ~22 | — | 14.3 |
| Δε | — | −0.1 | — | ~0 |

Chemical formula 1

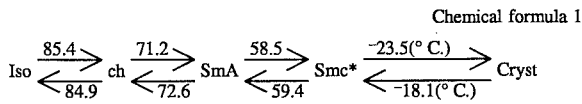

Figure 4A:
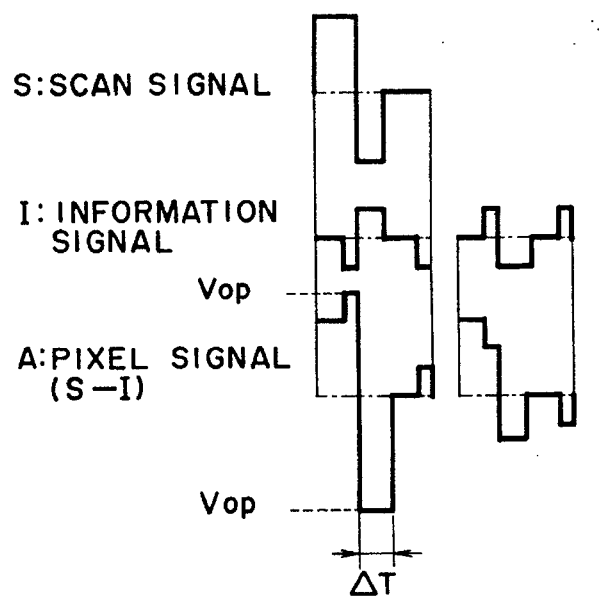
FIGS. 4A and 4B are waveform diagrams of driving voltages which are used in the apparatuses of FIG. 1 and FIGS. 5A to 5D.
Figure 4B:
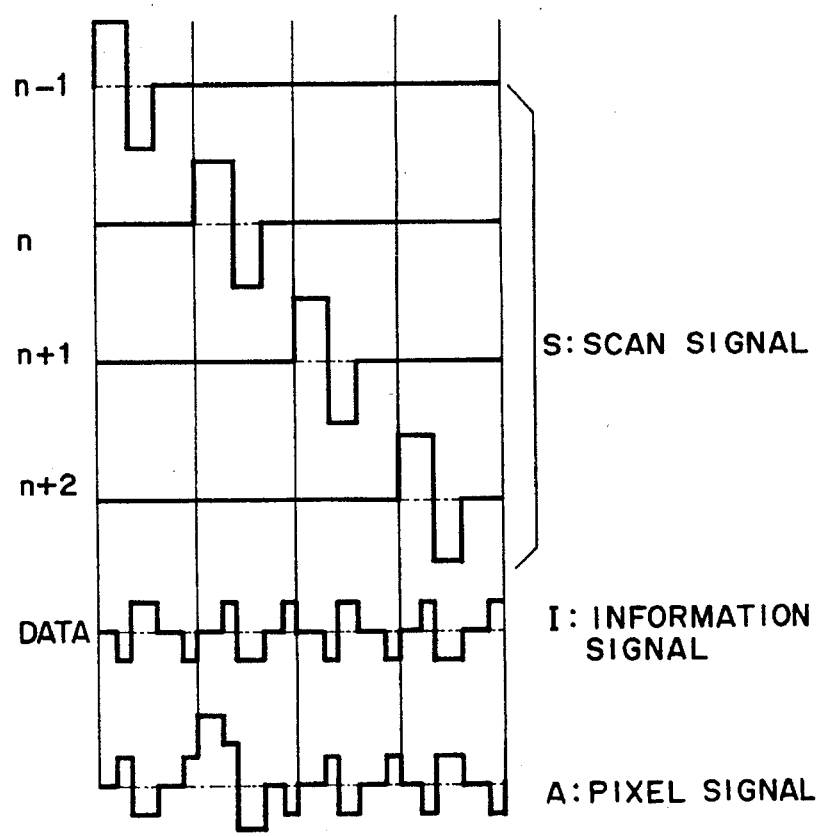

A pixel signal A is applied to the above device by using a scan signal S and an information signal I which have driving waveforms shown in FIGS. 4A and 4B in a manner such that ΔT=40 μsec and $V_{op}$ is equal to 21 volts in the case where the whole area is displayed in white and $V_{op}$ is equal to 15 volts in the case where the whole area is displayed in black, Stabilities in the domain forming operations at a portion near the summit portion of the rib 22 when $V_{op} \cong 15.5$ volts and at a portion near the bottom portion when $V_{op} \cong 20.5$ volts were observed, As shown in FIGS. 2D and 2E, consequently, thin elongated domains were stably formed along the rib 22.

It will be understood from the above results that the stabilities are remarkably improved as compared with the conventional cases shown in FIGS. 3C and 3D in which the rubbing operations were executed in the same direction as the rib. The effect of the stability of the domain is remarkable in the case where the rib is continuously formed in the cell and convex and concave portions exist due to it.

As will be also obviously understood by comparing FIGS. 2D and 2E with FIGS. 4C and 4D, the resolution in the gradation display itself is also increased. In other words, the domain of a smaller width can be displayed.

FIG. 5A is a cross sectional view of a liquid crystal device according to another embodiment of the invention. An FLC 51 is a liquid crystal having characteristics shown in the column B in Table 1 and the following chemical formula 2.

Chemical formula 2

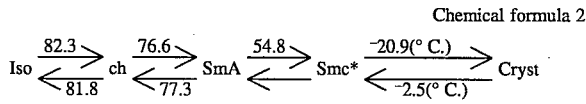

The rubbing directions are set to directions shown by arrows 52 and 53 with respect to the orientation films of the upper and lower layers 23 as shown in FIG. 5B when they are seen from the upper portion of the device, respectively. That is, the intersection rubbing processes are executed in such directions that they are rotated by about 7° toward the direction in which a right screw progresses when it is seen from the upper surface of the cell. A polyimide film containing fluorine atoms is used as such an orientation film. The good orientation is derived by executing the intersection rubbing processes by using the above orientation films. The cell shown in FIG. 5A has a construction similar to that shown in FIG. 2A except the liquid crystal and the orientation films. The display states of transmittances of 5% and 95% are written into the above cell by using driving waveforms shown in FIGS. 4A and 4B on the assumption that $\Delta T$ is set to 40 μsec and $V_{op}$ is set to up to 16 volts (T=5%) and $V_{op}$ is set to up to 21 volts (T=95%). Thus, the stable domains can be formed along the ribs 22 as shown in FIGS. 5C and 5D.

In this case, the normal line direction of the layer of the liquid crystal projected onto the cell surface is equal to the direction which is parallel with the rib 22. That is, to obtain the above effect, it is more significant that "the layer direction" is parallel with the rib 22 rather than the case of "the rubbing direction".

According to the invention as described above, since the liquid crystal molecules are oriented so that the normal line of the liquid crystal layer projected onto the electrode substrate surface perpendicularly crosses the direction of the stripeshaped rib, the domain shapes in the display states of low and high transmittances can be set into thin, long, and stable domain shapes.

FIG. 3A shows substantially the same device as that of FIG. 2A except that a rubbing direction 31 is set to be parallel with the longitudinal direction of the stripe-shaped rib.

According to the device shown in FIG. 3A, a difference occurs in stability of the domain in accordance with the display gradation level. For instance, in the case of performing the display whose transmittance T is equal to about 50% as shown in FIG. 3B, the domain wall is stable. However, in the case of executing the display whose transmittance T is low and is equal to about 5% as shown in FIG. 3C, it has been confirmed that the domain shape is easily finely cut out and it is difficult that the uniform domain wall along the rib 22 exists.

What is claimed is:

1. A method for producing a liquid crystal element, comprising the steps of:

selecting a pair of electrode substrates;

forming a configuration of periodic stripe-like ribs on at least one of the pair of electrode substrates;

subjecting each of said pair of electrode substrates to a rubbing processing in which the rubbing of the lower substrate is made in a direction at an angle rotating in a clockwise direction from a rubbing direction of the upper substrate;

selecting a chiral smectic liquid crystal which changes state between isotropic phase, cholesteric phase and smectic A phase according to temperature;

injecting said chiral smectic liquid crystal between said pair of electrode substrates;

providing means for applying a voltage between said pair of electrode substrates, said voltage forming a transmittance in said liquid crystal according to a gradation;

wherein a normal line with respect to plural layers arranged in a uniform direction composed of plural molecules projected onto the surface of said electrode with said stripe-like ribs crosses said stripe-like ribs.

2. A method according to claim 1, wherein a width of said rib is 10 μm–500 μm.

3. A method for producing a liquid crystal element, comprising the steps of:

selecting a pair of electrode substrates;

forming a configuration of periodic stripe-like ribs on at least one of the pair of electrode substrates;

subjecting an electrode substrate to a rubbing processing in a direction;

selecting a chiral smectic liquid crystal which changes state between isotropic phase, cholesteric phase and smectic A phase according to temperature;

injecting said chiral smectic liquid crystal between said pair of electrode substrates;

providing means for applying a voltage between said pair of electrode substrates, said voltage forming a transmittance in said liquid crystal according to a gradation;

wherein a normal line with respect to plural layers arranged in a uniform direction composed of plural molecules projected onto the surface of said electrode with said stripe-like ribs crosses said stripe-like ribs.

* * * * *

UNITED STATES PATENT AND TRADEMARK OFFICE
CERTIFICATE OF CORRECTION

PATENT NO. : 5,499,130
DATED : March 12, 1996
INVENTOR(S) : Shinjiro Okada

It is certified that error appears in the above-indentified patent and that said Letters Patent is hereby corrected as shown below:

COLUMN 1

Line 66, "10" should be deleted.

COLUMN 3

Line 3, "black," should read --black.--.
Line 5, "observed," should read --observed.--.
Line 12, "of-the" should read --of the--.
Line 58, "stripeshaped" should read --stripe-shaped--.

COLUMN 4

Line 53, "substrates;" should read --substrates; and--.
Line 33, "gradation" should read --gradation; and--.
Line 34, ":" should be deleted.

Signed and Sealed this

Sixth Day of August, 1996

Attest:

BRUCE LEHMAN

Attesting Officer       Commissioner of Patents and Trademarks